US007537669B2

(12) United States Patent
Jarck

(10) Patent No.: US 7,537,669 B2
(45) Date of Patent: May 26, 2009

(54) SYSTEM AND METHODS FOR THE PRODUCTION OF STEAM-PRESSED LONG FIBER RECONSOLIDATED WOOD PRODUCTS

(75) Inventor: Walter Jarck, Clarksville, GA (US)

(73) Assignee: TimTek LLC, Clarkesville, GA (US)

( * ) Notice: Subject to any disclaimer, the term of this patent is extended or adjusted under 35 U.S.C. 154(b) by 346 days.

(21) Appl. No.: 11/162,748

(22) Filed: Sep. 21, 2005

(65) Prior Publication Data

US 2006/0060290 A1 Mar. 23, 2006

Related U.S. Application Data

(60) Provisional application No. 60/612,075, filed on Sep. 22, 2004.

(51) Int. Cl.
*B32B 38/04* (2006.01)
*B29C 65/02* (2006.01)

(52) U.S. Cl. ....................... 156/264; 156/578; 156/498; 156/510; 156/499

(58) Field of Classification Search ................. 156/265, 156/578, 498, 510, 499; 144/332, 344
See application file for complete search history.

(56) References Cited

U.S. PATENT DOCUMENTS 3,508,523 A * 4/1970 Meerleer ..................... 118/63
3,891,738 A * 6/1975 Shen .......................... 264/101
4,232,067 A 11/1980 Coleman
4,393,019 A 7/1983 Geimer
4,517,147 A 5/1985 Taylor et al.
4,605,467 A * 8/1986 Bottger ........................ 156/497
4,655,869 A * 4/1987 Tellman et al. .............. 156/252
4,675,066 A * 6/1987 Honda ......................... 156/285
4,684,489 A * 8/1987 Walter ......................... 264/101
4,695,435 A 9/1987 Spector
4,704,316 A 11/1987 Grace
4,711,684 A 12/1987 Coleman
4,711,689 A 12/1987 Coleman
4,937,024 A * 6/1990 Hickson ...................... 264/83

(Continued)

FOREIGN PATENT DOCUMENTS

AU WO85/02366 6/1985

(Continued)

OTHER PUBLICATIONS

College of Forest Resources, Mississippi State University, Forest & Wildlife Research Center. The Use of Antioxidants to Increase the Effectiveness of Wood Preservatives. [online], [retrieved on Dec. 1998]. Retrieved from the Internet <URL:http://www.cfr.msstate.edu/fwrc/forestp/anti.htm>.

(Continued)

*Primary Examiner*—George R Koch, III
(74) *Attorney, Agent, or Firm*—Morris, Manning, Martin LLP

(57) ABSTRACT

The present invention relates generally to the timber products industry, and particularly to methods and apparatus for use in the manufacture of reconstituted or reconsolidated steamed-pressed long fiber wood products. More particularly, the present invention relates to methods and apparatus for use in the manufacture of reconstituted or reconsolidated wood products using crushing and steam pressing methods and apparatuses.

54 Claims, 12 Drawing Sheets

U.S. PATENT DOCUMENTS

| | | | | |
|---|---|---|---|---|
| 5,106,697 | A * | 4/1992 | Whittemore | 428/529 |
| 5,161,591 | A | 11/1992 | Sealey et al. | |
| 5,279,691 | A | 1/1994 | Stickland | |
| 5,662,760 | A * | 9/1997 | Tsuda | 156/264 |
| 5,755,917 | A * | 5/1998 | Barnes | 156/296 |
| 6,098,679 | A * | 8/2000 | Go et al. | 144/361 |
| 6,263,773 | B1 | 7/2001 | McAdoo et al. | |
| 6,318,046 | B1 | 11/2001 | Horsfield et al. | |
| 6,344,165 | B1 | 2/2002 | Coleman | |
| 6,428,871 | B1 | 8/2002 | Cozzolino | |
| 6,533,890 | B1 * | 3/2003 | Berger et al. | 156/296 |
| 6,635,141 | B2 | 10/2003 | Horsfield et al. | |
| 6,868,877 | B2 * | 3/2005 | Lines | 144/332 |
| 6,938,541 | B2 * | 9/2005 | Vomberg | 100/316 |
| 2002/0064622 | A1 * | 5/2002 | Courtney | 428/106 |
| 2003/0102052 | A1 * | 6/2003 | Lines | 144/346 |
| 2004/0040625 | A1 * | 3/2004 | Knokey et al. | 144/347 |
| 2005/0241743 | A1 * | 11/2005 | Mbachu et al. | 156/64 |
| 2005/0257888 | A1 * | 11/2005 | Williamson et al. | 156/331.1 |
| 2006/0060290 | A1 | 3/2006 | Jarck | |
| 2006/0086427 | A1 | 4/2006 | Jarck | |
| 2007/0122644 | A1 * | 5/2007 | Jarck | 428/537.1 |
| 2008/0110565 | A1 * | 5/2008 | Parker | 156/296 |

FOREIGN PATENT DOCUMENTS

| | | |
|---|---|---|
| AU | WO85/02367 | 6/1985 |
| AU | WO85/02368 | 6/1985 |
| AU | WO85/02369 | 6/1985 |
| AU | WO85/02370 | 6/1985 |
| AU | WO89/11383 | 11/1989 |
| GB | 2176791 | 1/1987 |
| WO | WO88/04983 | 7/1988 |
| WO | WO2006/036713 | 4/2006 |

OTHER PUBLICATIONS

Schultz TP, Nicholas DD, Development of environmentally-benign wood preservatives based on the combination of organic biocides with antioxidants and metal chelators, Phytochemistry, 2002; Nov.; 61(5):555-60. Abstract.

* cited by examiner

"Surfing" Shells on Crush Roll
(Top roll only)

Vertical Rods on Crush Roll
(Top & Bottom rolls)

Profiles for the first scrimming station after the crush roll. It is preferred that separation of the top and bottom roll be variable, but if it is not, the separation shown can be used. All Dimensions in mm.

Profiles for the second scrimming station after the crush roll. It is preferred that separation of the top and bottom roll be variable, but if it is not, the separation shown can be used. All Dimensions in mm.

Profiles for the fourth scrimming station after the crush roll. It is preferred that separation of the top and bottom roll be variable, but if it is not, the separation shown can be used. All Dimensions in mm.

Profiles for the fifth scrimming station after the crush roll. It is preferred that separation of the top and bottom roll be variable, but if it is not, the separation shown can be used. All Dimensions in mm.

Profiles for the sixth scrimming station after the crush roll. It is preferred that separation of the top and bottom roll be variable, but if it is not, the separation shown can be used. All Dimensions in mm.

Profiles for the seventh scrimming station after the crush roll. It is preferred that separation of the top and bottom roll be variable, but if it is not, the separation shown can be used. All Dimensions in mm.

Profiles for the eighth scrimming station after the crush roll. It is preferred that separation of the top and bottom roll be variable, but if it is not, the separation shown can be used. All Dimensions in mm.

SYSTEM AND METHODS FOR THE PRODUCTION OF STEAM-PRESSED LONG FIBER RECONSOLIDATED WOOD PRODUCTS

CROSS-REFERENCE TO RELATED APPLICATIONS

This application claims the benefit, pursuant to 35 U.S.C. §119(e), of U.S. Provisional Patent Application entitled “METHOD AND APPARATUS FOR THE MANUFACTURE OF RECONSOLIDATED OR RECONSTITUTED WOOD PRODUCTS,” filed on, Sep. 22, 2004, and assigned Ser. No. 60/612,075, the disclosure of which is incorporated herein by reference in its entirety.

FIELD OF THE INVENTION

The present invention relates to an improved method and apparatus for the use in the production of steam-pressed long fiber reconsolidated wood products.

BACKGROUND OF THE INVENTION

The present invention relates generally to the timber products industry, and particularly to methods and apparatus for use in the manufacture of reconstituted or reconsolidated wood products. The manufacture of reconsolidated wood products is well known in the timber industry. U.S. Pat. No. 4,232,067 discloses a method for making a reconsolidated wood product, wherein the wood product comprises numerous wood splinters, a substantial proportion of the wood splinters being substantially separately defined but non-discrete the splinters being bonded together. The bonding of the wood splinters may be produced by the use of a suitable bonding agent or alternatively the splinters may be treated with a suitable material to render plastic the outer surfaces of the splinters whereby they can be bonded by application of pressure thereto.

U.S. Pat. No. 4,711,684 discloses a process for the production of reconsolidated wood products. The patent describes a process for the partial rending of wood to form a flexible open lattice work web of naturally interconnected wood strands that are generally aligned along a common grain direction. The rending describe within the patent is achieved by rolling the natural wood between a pair of rollers, arranged with generally parallel axes, so as to engage the natural wood from either side with repetitive back and forth movements of one roller relative to the other roller.

U.S. Pat. No. 4,711,689 describes a process for forming a reconsolidated wood product, wherein a bonding agent is applied to a lattice work web of interconnected wood strands that are subsequently subjected to compression in order to consolidate the interconnected wood strands into the reconsolidated wood product. A wax is applied to the wood strands before the application of the bonding agent in order to limit the pick-up of the bonding agent by the wood strands.

It is also well known in the timber industry to use steam in methods and apparatus for producing reconstituted wood products. Currently many methods utilize steam in conjunction with wood component compression methods or steam injection compression within the processes of making reconstituted or reconsolidated wood products. The wood component steaming processes are most effective when used in conjunction with adhesives or bonding agents in order to combine the wood component materials together into a structurally sound resulting wood product. In the above examples, steam pressing is employed to compress the wood components in addition to applying heat to the compressed wood products in order to cure the bonding agent or adhesive with which the wood component materials are mixed. Traditionally, a charge of wood component and adhesive or bonding agent is compressed between two platens, wherein thereafter steam is introduced to the wood component and adhesive/bonding agent mixture in order to form the final wood product. The steam supplies the heat for plasticizing the wooden components and for curing the adhesive or bonding agent that has been applied to the wood component in order to create the final wood product.

The above-described processes have been found to produce sufficient wood products. However, the quality of a resultant wood product is influenced by the quality of the wood strands that are used to form the respective wood product in addition to the specific steaming and pressing operations that implemented in order to produce the final wood product. Therefore, it is an aim of the present invention to provide a method and apparatus that overcomes and improves upon existing methods and apparatus for the forming of steam-pressed long fiber reconstituted or reconsolidated wood products.

SUMMARY OF THE INVENTION

The present invention relates to a system and method for the production of steamed-pressed long fiber reconsolidated wood products.

Aspects of the present invention comprise a system for the manufacture of steamed-pressed long fiber reconsolidated wood products. The system comprises a bonding agent application system for applying bonding agent to a scrim log material mat. The bonding agent application system further comprises a roller mechanism, wherein the roller mechanism is configured to compress the scrim log material mat in order to further open any fissures or cracks within the scrim log material mat in order to aid in the uniform application of the bonding agent onto the scrim log material mat.

The system further comprises a drying system. The drying system is equipped with a conveyor transport system for transporting the scrim log material mat through the drying system. Also, the speed of the conveyor transport and the heat output by the drying system are configured to be operated either manually or automatically via a computer control system.

Additionally, the system comprises an incremental mat cut-off system, wherein the scrim log material mat is cut to a predetermined size and a scrim log material mat lay-up system. A scrim log material mat pre-press system is provided for the further refined formation of the scrim log material mat, the pre-press system comprising platens or a roller press system, wherein the platens or the rollers of the roller press system are configured to conduct heat.

The system also comprises a steam press chamber that is configured to release a predetermined volume of steam into the steam press chamber in order to cure the bonding agent that has been applied to the scrim log material mat. The steam press chamber further comprises a pressing mechanism, wherein the pressing mechanism is configured to compress the scrim log material mat to a predetermined thickness and density.

A further aspect of the present invention comprises a method for the manufacture of steamed-pressed long fiber reconsolidated wood products. The method comprises the steps of applying a bonding agent to a scrim log material mat at a bonding agent application system and thereafter drying the scrim log material mat at a drying station. The amount of heat generated by the dryer system and the speed of a conveyor transport system traveling through the dryer system are regulated by a computerized control system.

Next, the scrim log material mat is cut to a predetermined size at an incremental scrim log material mat cut-off system. The scrim log material mat is then transported to a scrim log material mat lay-up system. The formation of the scrim log material mat is further refined at a pre-press system, wherein the pre-press system comprises either a set of platens or a roller press system, wherein the platens and the rollers of the roller press system are configured to conduct heat.

After, the pre-pressing step, the scrim log material mat is steamed and pressed at a steam press chamber that is configured to release a predetermined volume of steam from a surge tank into the steam press chamber in order to cure the bonding agent that has been applied to the scrim log material mat. Further, the volume of the surge tank is equal to the volume of the steam press chamber.

A yet further aspect of the present invention comprises a computer program product that includes a computer readable medium that is usable by a control unit processor. The computer readable medium has stored thereon a sequence of instructions that when executed by a control unit processor causes the control unit processor to execute the steps of determining the moisture content of a scrim log material mat and determining the weight of a scrim log material mat.

The computer program product further utilizes the determined moisture content and weight of the scrim log material mat to calculate adjustments that are to be made to the scrim log material mat in order to remove any voids that may be present in the scrim log material mat. The computer program product also utilizes the determined moisture content and weight of the scrim log material mat to calculate adjustments that are to be made to the weight of scrim log material mat in order to adjust the scrim log material mat to a desired predetermined weight.

DETAILED DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
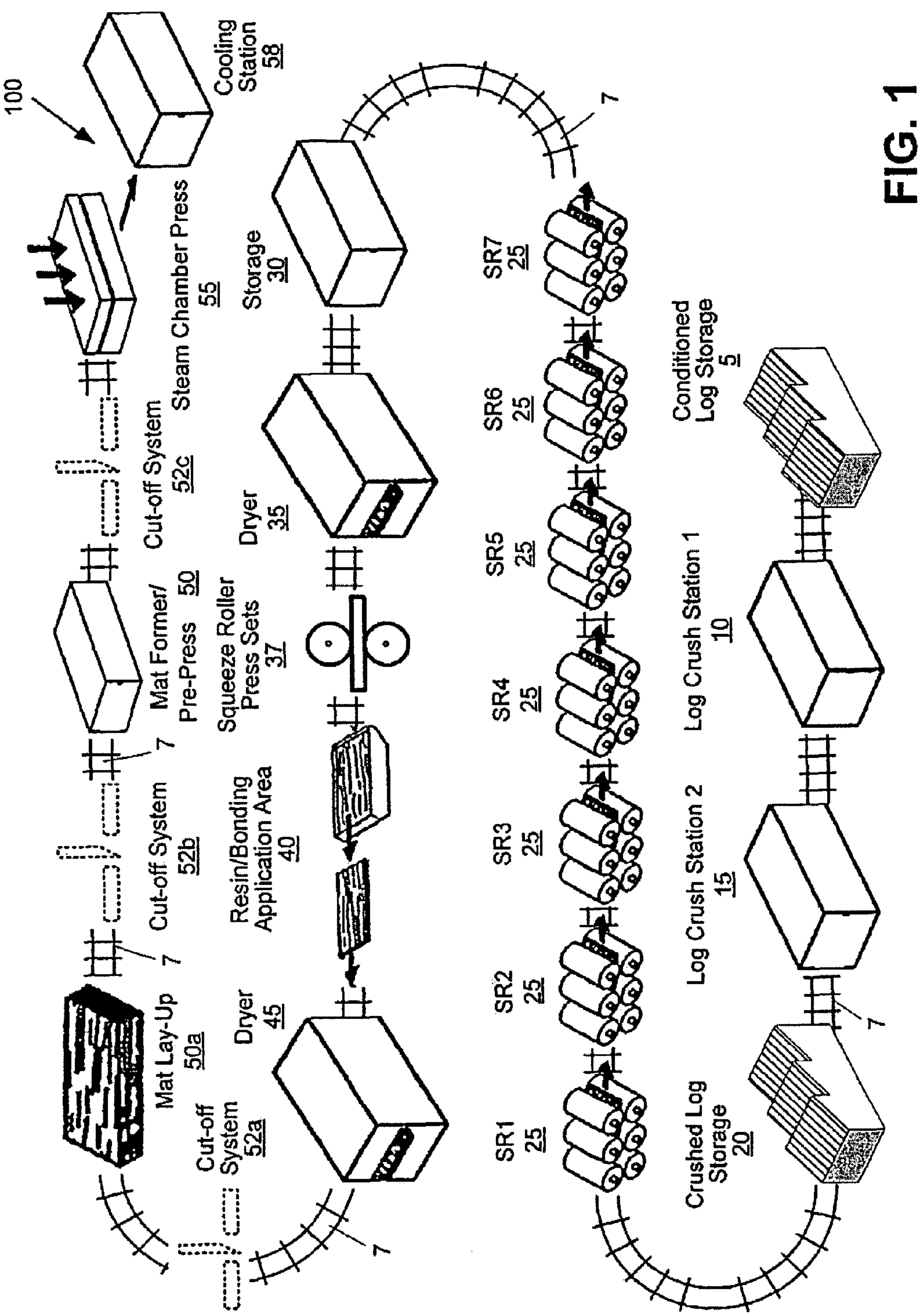
FIG. 1 is a diagram illustrating a production line system for the reconstitution or reconsolidation of wood products that may be implemented in embodiments of the present invention.

One or more exemplary embodiments of the invention are described below, the disclosed embodiments are intended to be illustrative only since numerous modifications and variations therein will be apparent to those of ordinary skill in the art. Further, all embodiments of the present invention may be either be implemented, assisted or controlled via computerized control systems, wherein the computerized control systems can be a conventional personal computer system. The computing systems further include user interfaces that operate in accordance with conventional windowing graphical user interface (GUI) paradigms.

The computerized control systems can further comprise additional hardware and software elements of the types generally included in conventional personal computers, such as a processor, a main memory, a disk storage device such as a hard disk drive, input/output interfaces, an image scanner, a mouse, a keyboard and a removable read/write storage device such as a drive that uses a CD-ROM or a floppy disk.

The software elements of the computerized control system are executable in the main memory, but as persons skilled in the art will understand, the software elements may not in actuality reside in its entirety in the main memory. The computerized control systems can further comprise other hardware and software elements of the types conventionally included in personal computers, such as an operating system.

The logs utilized within aspects of the present invention preferably are freshly harvested logs. Accordingly, the logs must promptly be used or, in the event the logs are not promptly used, liberally sprinkled with water in order to prevent the logs from drying out. Logs that are used within aspects of the present invention should preferably have a first and second end with the large-end diameters of the logs being in the range of 3" to 8" and the length of the logs being in the range of 7' to 14'. Furthermore, all logs used within aspects of the present invention should preferably be free of limb stubs, bark, and obvious defects such as rot, disease, and forked stems.

Typically, debarking equipment that causes roughing of the outer surface of a log will increase the amount of fines, or splintered wood segments, generated during the processing of the log. In general, tree bark comprises two very important elements: the outer bark—which comprises mostly dead tissue—forms a protective barrier between the tree and the outside environment, and the inner bark. The inner bark comprises tissue that includes living cells where sugar transport for the tree occurs. Within wood product processing lines, the clean debarking of the outer and inner bark of the log may improve the bonding qualities of the scrim log material during subsequent bonding operations, in addition to enhancing other properties of the manufactured wood product.

The selection of logs to process within aspects of the present invention additionally comprises determining an acoustic value for each log by a log acoustic measurement device in order to determine the stiffness of each respective log. Within aspects of the present invention the acoustic value of a log can be obtained using a log acoustic measurement device that determines the acoustic value of a log, and based upon the determined acoustic value, assign a scale value to the log that references the stiffness of the log. Individual logs have differing acoustic values based upon the particular moisture content of a specific log, the micro-fibril angle of the cellulose chains in the cells of the log, and the structural and strength characteristics of the log. The micro fibril angle of the cellulose chains in the individual cells of a log is a key determinant of log stiffness characteristics, wherein low micro-fibril angles of the cellulose chains result in high stiffness characteristics within a log and the decreased longitudinal shrinkage of a log.

The determined log acoustic value is used within aspects of the present invention to grade logs and/or cull logs from the subsequent wood product manufacturing process. In practice, as logs are processed on a production line, a value is determined for each log as it travels through the de-barking line of the log line. A threshold value is set and logs that are determined to possess acoustic values above the predetermined threshold are permitted to proceed through the log processing line. In contrast, logs that are determined to possess acoustic values below the threshold are rejected and transferred from the log processing line and sent to a chipper to make fuel for a boiler, or stacked and resold to a paper mill or some other alternative use. Further, the acoustic value of a log can be statistically correlated with the modulus of elasticity (MOE) of individual pieces of wood, and hence affect the MOE of a product that is subsequently manufactured from the log.

The quality of a resultant wood product from the processing line is predicated upon the quality of the scrim log material that is produced within the log processing line. An important step in producing quality scrim log material is the initial conditioning of the logs by either an indirect steaming process or a hot water soak prior to the logs being crushed and scrimmed. Log scrim quality within scrim log material is significantly improved by the indirect steaming of the logs before they are crushed and scrimmed. However, logs that are heated over a water bath for two hours, or until a core temperature of 125° F. is reached, additionally result in optimal scrim material.

It is important within aspects of the present invention that conditioned logs not be soggy or over saturated from the conditioning process, preferably conditioned logs need to retain some degree of crispness so that they split easily into log length strands. Conditioned logs should be quickly processed through the present system, and if not, then the conditioned logs should be covered to retain their heat and moisture. The over conditioning of a log can result in knots within the log that become too soft to separate from the strands of the crushed and scrimmed material of the log. Therefore, log conditioning chambers should be located as close as possible to a log processing area in order to reduce the cooling of the logs during the transportation and storage of the logs.

The present invention is initially described in reference to FIG. 1. FIG. 1 illustrates an overall processing line system 100 that may be implemented within embodiments of the present invention. The specific stations and processing areas within the process line system 100 can be configured as desired. As shown, the preferred system 100 of FIG. 1 comprises a conditioned log storage area 5, a first and second log crushing station 10, 15, a crushed log storage station 20, scrim roll stations 25*a*-25*g*, a scrim roll mat storage area 30, a first dryer 35, a resin/bonding agent application area 40, a second dryer 45, a scrim-mat lay-up area 50*a*, a scrim-mat former/pre-press area 50*b*, and a steam chamber press 55.

As shown in FIG. 1, aspects of the present invention comprise a log conditioning station 5 for the storage and conditioning of a plurality of logs, wherein the plurality of logs are conditioned by either an indirect steaming process or a hot water soak. After being subjected to the conditioning operation, the logs are stacked and stored in the log storage facility 5 until they are ready to be introduced to the initial or first log crushing station 10. Within aspects of the present invention logs and processed log materials are transported throughout the system 100 from station to station via a conveyor transport system 7. The speed and direction of the conveyor transport system is controlled and directed via a computer control system.

Upon removal from the log storage facility 5, conditioned logs are deposited upon the conveyor transport system 7, wherein the conveyor transport system 7 transports the logs to the first log crushing station 10. Various aspects of the present invention call for the feeding of as many as six logs at a time into the first log crushing station 10. Additionally, aspects of the present invention require that the respective logs that are fed into the first crushing station 10 be alternately oriented, with the tops and large ends of the logs being position in this manner.

Prior to entering the first crushing station 10, the logs being fed into the first crushing station 10 are scanned by a log-scanning device (not shown) in order to acquire measurement data in regard to the diameter of a large and a small end of each log. Within additional aspects of the present invention a log incisor (not shown) that is similar in configuration to a "spike" roll is utilized in order to produce small longitudinal cuts around the circumference of a log before the log is crushed. The longitudinal cuts help initiate and control the width of splits within a log, and improve the quality of subsequently produced scrim log material. Further aspects of the present invention provide for a cutting station (not shown) wherein the first and the second end of the logs are cut at a predetermined angle of cut in order to enhance the subsequent log scrimming process. The angle of cut of the log ends is variable in a range greater than about 15° and less than about 60°.

Figure 2B:
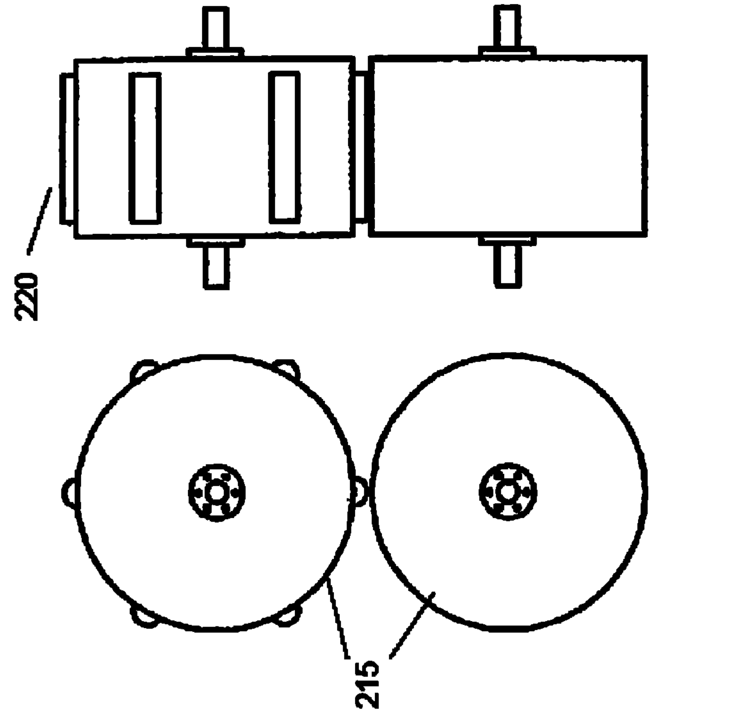
FIGS. 2A and 2B are diagrams illustrating rods that are located on crush rolls that may be utilized within various embodiments of the present invention.
Figure 2A:
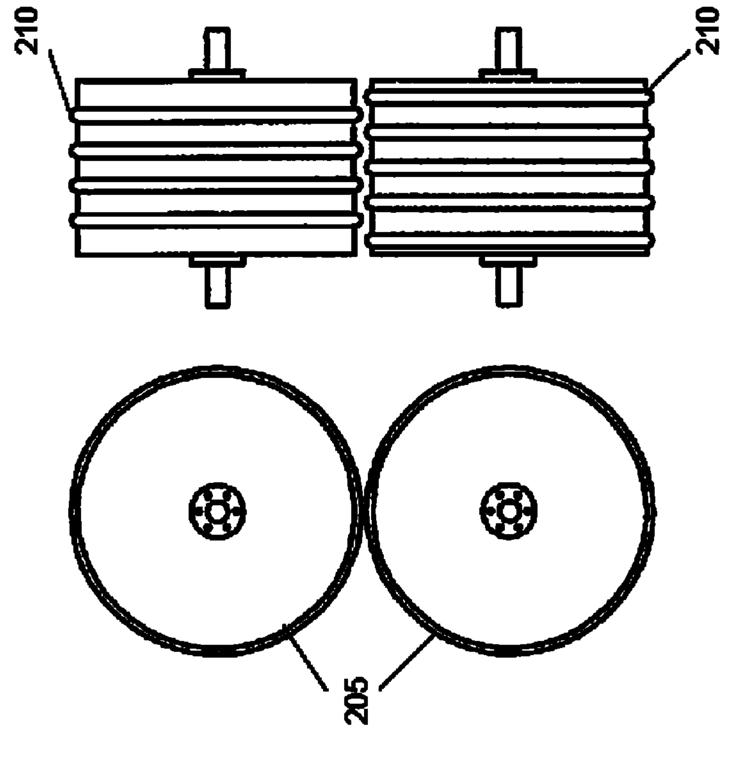

Within aspects of the present invention the first log crushing station 10 comprises a plurality of sets of crush rolls, the crush roll sets being configured to comprise a top crush roll and a bottom crush roll. As illustrated in FIG. 2A, aspects of the present invention call for the crush rolls 205, 206 to comprise a plurality of 20 mm diameter annular rods 210, wherein the annular rods 210 are set in a range of 80 mm to 100 mm apart around the circumference of the crush rolls 205, 206. The annular rods 210 of the crush roll sets 205, 206 are configured in an offset position upon the crush roll sets 205, 206 so that the centers of the top crush roll 205 annular rods 210 are positioned halfway in distance between the annular rods 210 of the bottom crush roll 206. Therefore, the annular rods 210 of the top crush roll 205 extend into the spaces that are next to the annular rods 210 of the bottom crush roll 206. This particular annular rod 210 configuration allows for the annular rods 210 to efficiently split logs into smaller segments, and therefore, reduce the number of passes needed to complete a log crushing operation.

It must be noted that it is desirable that a well-crushed log remain basically intact in the shape of an elongated oval with well-defined cracking throughout the cross-section. This configuration of a crushed log is referred to as a "mat." Further, an intact crushed log should have the particular consistency of a limp bundle of wood strands. These particular aspects are accomplished when a log is properly conditioned and progressively crushed in a systematic manner as described above. In the event that a log is allowed to separate into two or more distinct pieces the effective crushing of that log is greatly reduced.

As described above, within aspects of the present invention logs should be processed by alternately feeding the large ends and small ends of the logs into the crushing station 10. Further aspects of the present invention provide for concurrently feeding as many as six logs at a time into the crushing station 10. An additional step of this initial log crushing operation requires that the logs that are being fed into the crusher be oriented with the large ends and small ends of the logs alternatively positioned. By positioning the logs in this configuration the chances of the small-ends of the crushed logs (or mats) being laid together with small-ends of adjacent crushed log are greatly minimized. Therefore, in aspects of the present invention the small-ends of a respective crushed log mat should be mated with the heavier large-ends of another crushed log mat in order to maintain and supply a continuous, even density of crushed log material throughout the subsequent processing step of the presently described invention. It must also be noted that the alternate feeding of the large and small end diameters of the logs into the crushing station is also essential in controlling the basis weight of a crushed log mat.

As illustrated in FIG. 1, aspects of the present invention provide for a second log crushing station 15, the second log crushing station 15 being implemented to aid in the efficient splitting of the logs crushed into smaller segments within the first crushing station 10. In order to ensure that the crushed logs are not structurally damaged by the crushing operations, the crushing pressure that is applied to the logs is adjusted as the logs pass through the second log crushing station 15. As illustrated in FIG. 2B, crush rolls 215, 216 may further be implemented wherein the top crush roll 215 comprises a series of horizontal rods 220 that are mounted to the surface of the crush roll cylinder 215, wherein the horizontal rods 220 are also parallel to the axis of the crush roll cylinder 215. By providing a set of crush rolls 215, 216 that comprise only one set of horizontal rods 220, the crush roll set 215, 216 configuration assists in ensuring that the crushed logs are not structurally damaged by the secondary crushing operation. Within further aspects of the present invention the crushing pressure of the crush roll sets 215, 216 may be adjusted by conventional manual methods or by a computer implemented mechanism.

A refined crushing operation is next utilized within aspects of the present invention to further crush the log mats with a predetermined specificity. Within aspects of the present invention, the crushing of the log mats should continue until the crushed log mats are fed through the smallest crush roll set gap that is possible without causing damage to the length of the strands within a log mat. This refined crushing operation helps crush the knots out of the logs, and further, to separate the strands around the knots. This particular refined crushing operation is accomplished within the present invention by utilizing a plurality of log scrimming stations 25*a*-25*g*, wherein each scrimming station 25*a*-25*g* comprises a plurality of scrim roll sets for the refined crushing of the crushed log material mat. As the crushed log material is passed through each scrimming station 25*a*-25*g*, the distance or space gap between each consecutive scrim roll set becomes progressively smaller, thus resulting in a finely crushed log material mat or scrim log material mat.

As mentioned above, aspects of the present invention comprise a plurality of scrim stations 25*a*-25*g*; each scrim station 25*a*-25*g* comprises pluralities of sets of scrimming rolls for the further crushing and refine cutting of the crushed log. The objective of the scrimming stations 25*a*-25*g* is to produce a group of separately defined, but not discrete, strands in which most of the strands are the length of the log and evenly separated from each other so as to produce a mat with a consistent basis weight. FIG. 1 illustrates a set of seven log scrimming stations 25*a*-25*g* for the refined crushing of the crushed log material. Other embodiments of the present invention can comprise as many scrim stations 25*a*-25*n* as needed to provide the desired texture and consistency of a specific scrim log material. Within aspects of the present invention, scrimming sets are configured to comprise a top scrim roll and a bottom scrim roll. Further, as illustrated in FIGS. 3A-3H, the scrim rolls can comprise varied sizes and spacing between the top and bottom rolls.

It has been observed in previous log material processing operations that oscillating scrim rolls can do considerable damage to processed scrim log material, therefore, the traditional oscillating scrim rolls have been replaced within aspects of the present invention with stationary adjustable fluted scrim rolls. The scrim rolls used within aspects of the present invention comprise fluted grooves that appear similar to ruffles in appearance. The fluted grooves of respective scrim roll sets comprise specific pitches, wherein the pitch of a flute is determined by the angle formed by two adjacent sides of a protruding flute segment.

As illustrated in the scrim roll profiles of FIGS. 3A-3H, the pitch of a flute and the flute depth of a scrim roll profile vary as the log proceeds through a plurality of scrim roll stations 25*a*-25*g*. In particular, the pitch distance—or the distance between two flute groove sides—determines the size of the scrim flute elements, while the depth of the flutes determines the amount of separation between the scrim elements. The pitch distance, and the depth and the angle the flute groove make with the shaft are all important considerations in achieving consistent scrim quality.

Figure 3A:
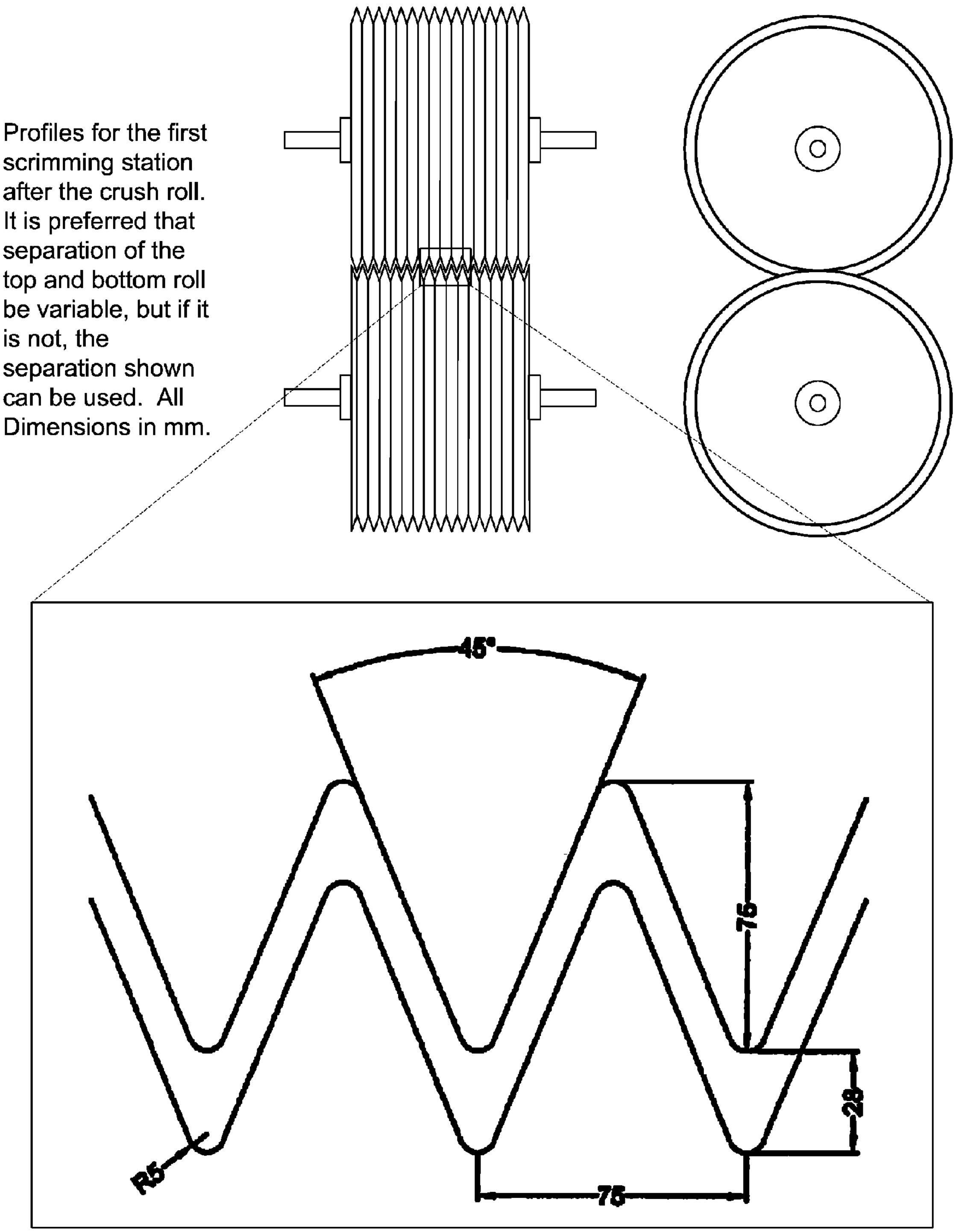
FIG. 3A-3H are diagrams illustrating profiles of scrim rolls that may be implemented in scrimming stations that are utilized within embodiments of the present invention.
Figure 3B:
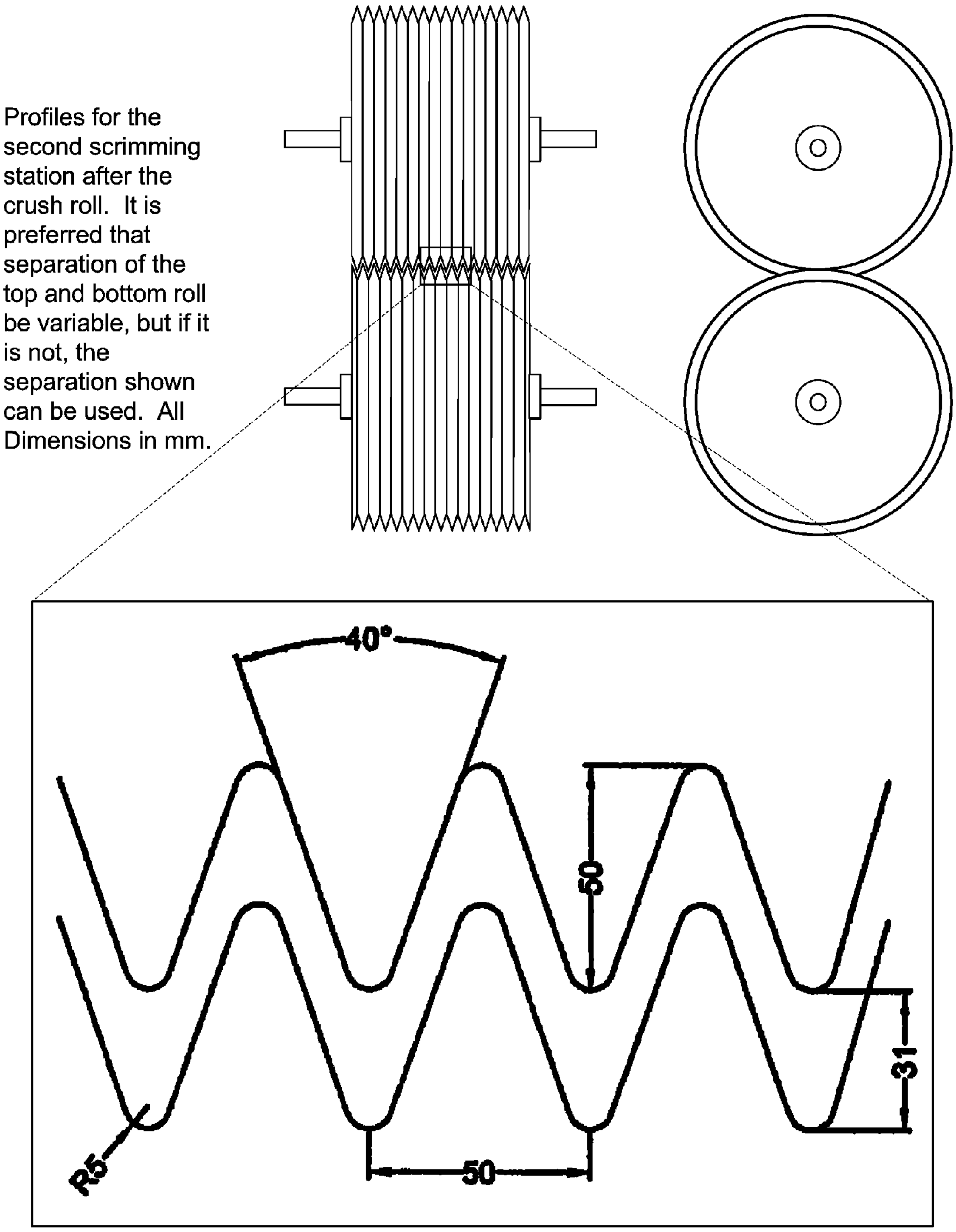
Figure 3C:
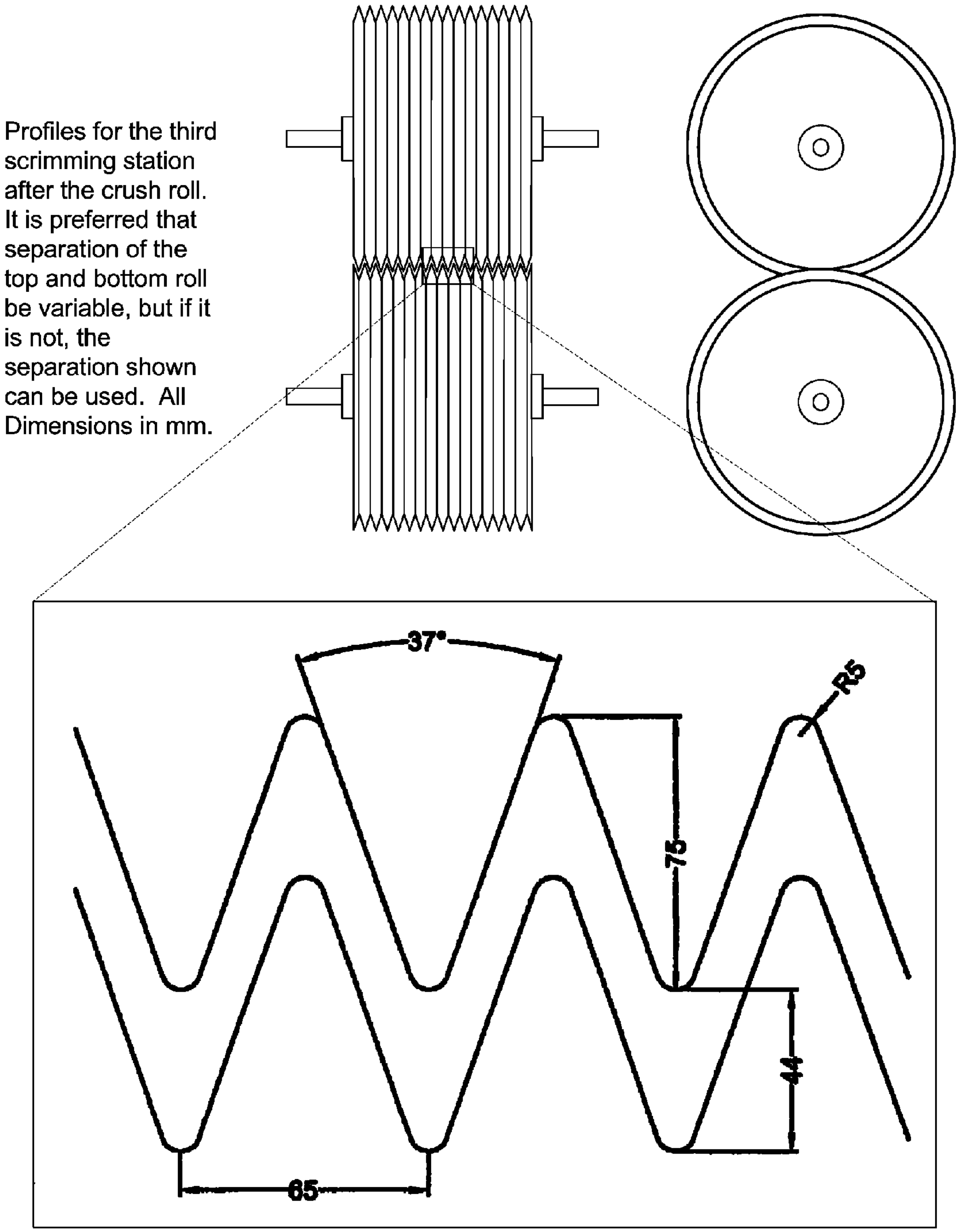
Figure 3D:
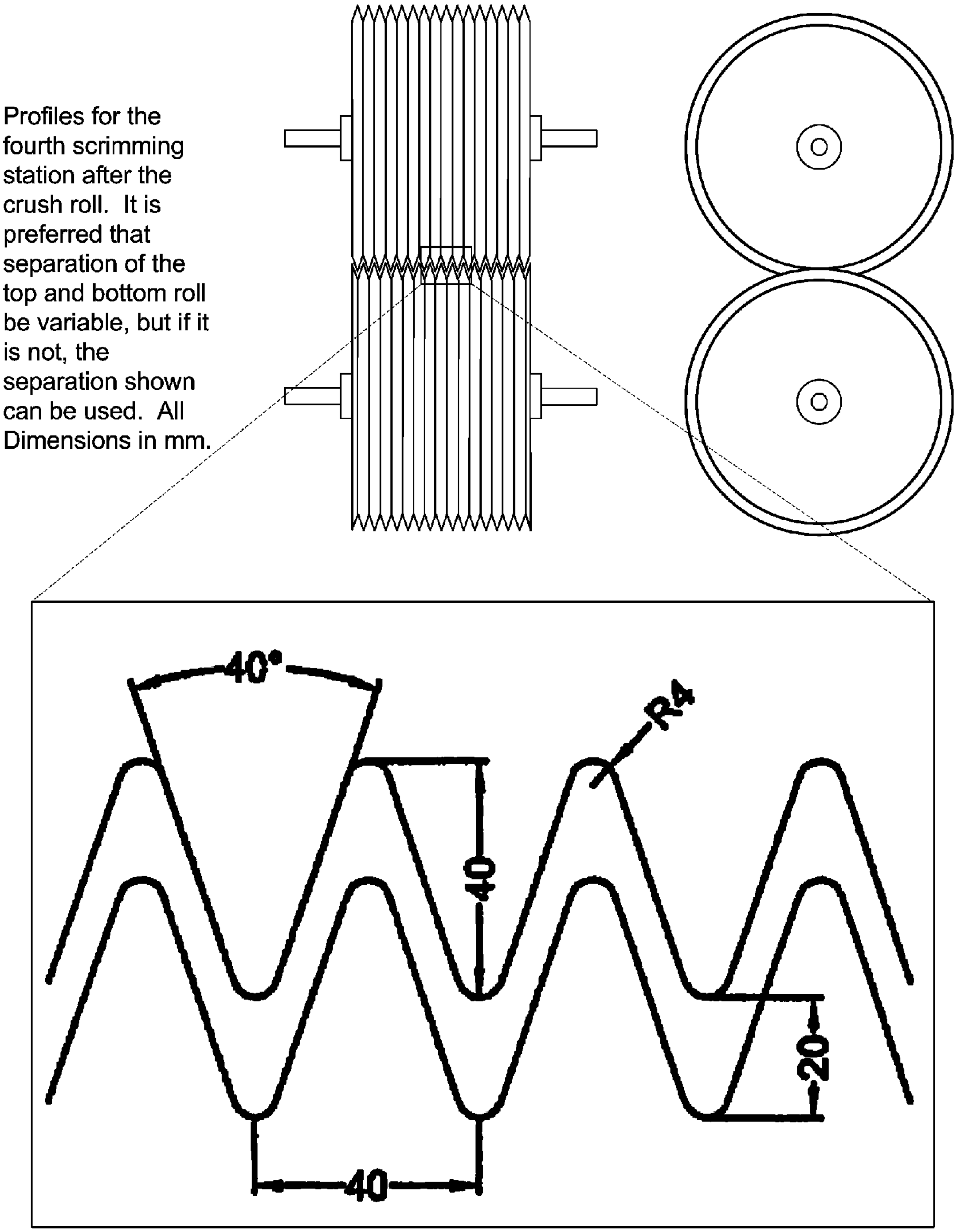
Figure 3E:
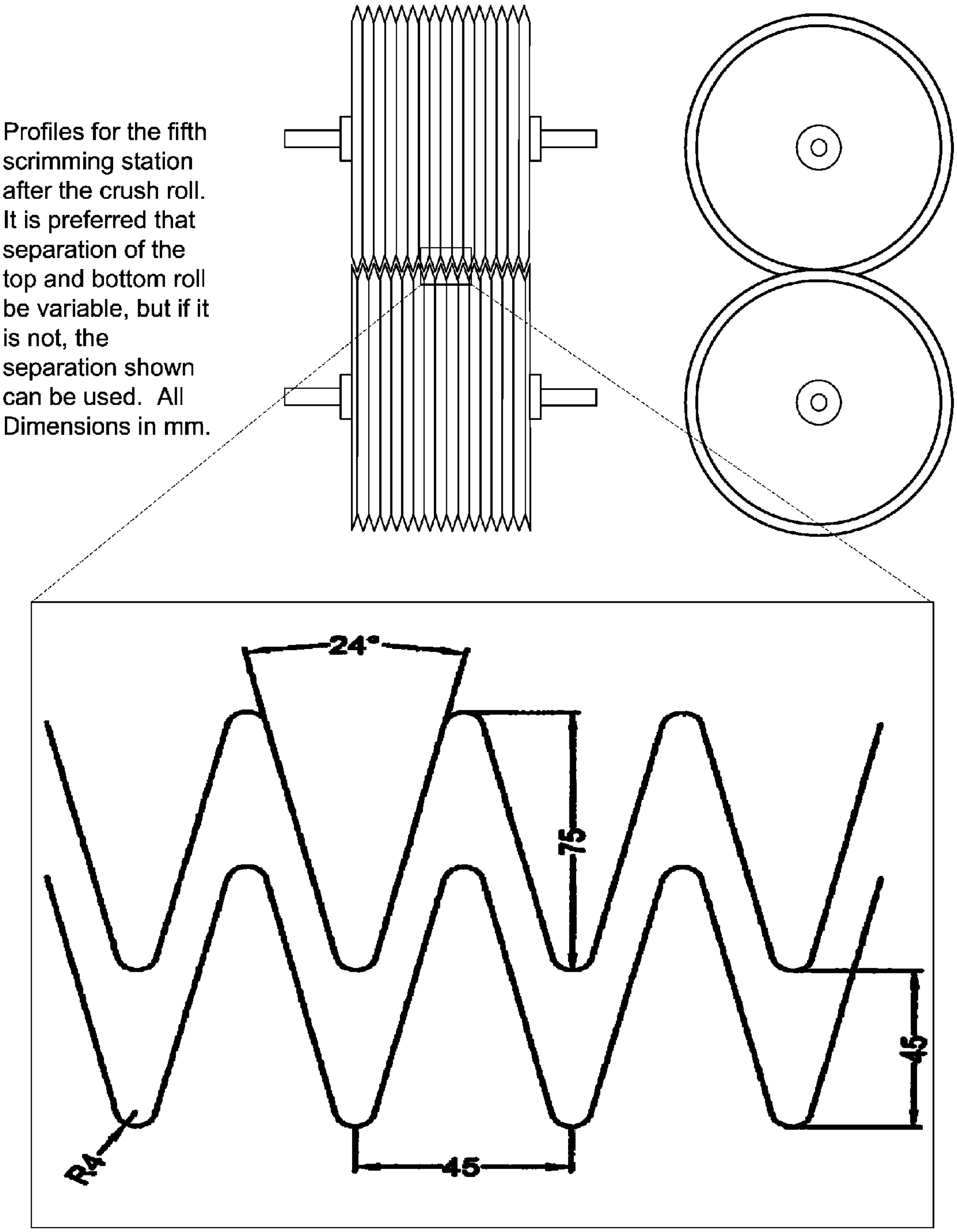
Figure 3F:
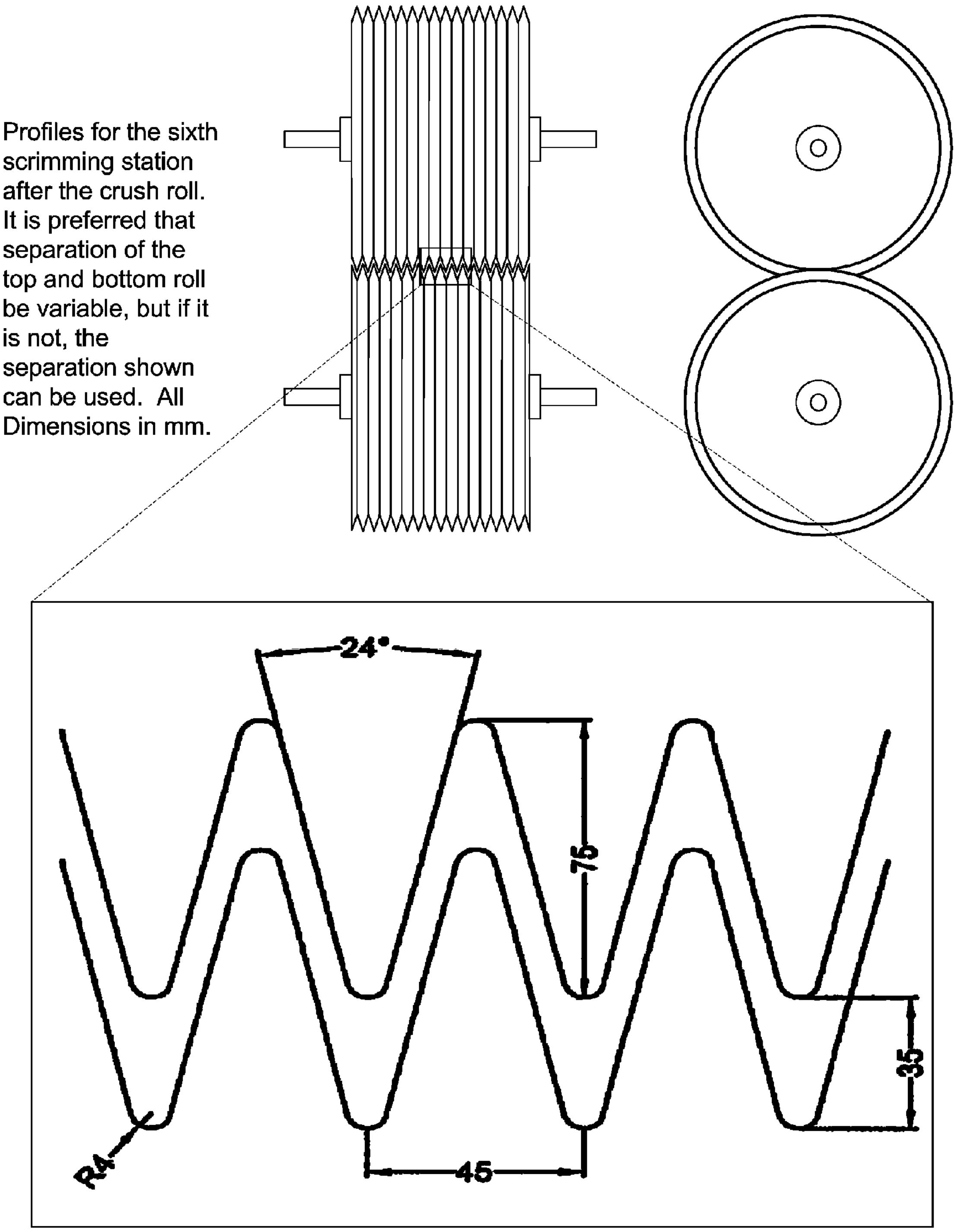
Figure 3G:
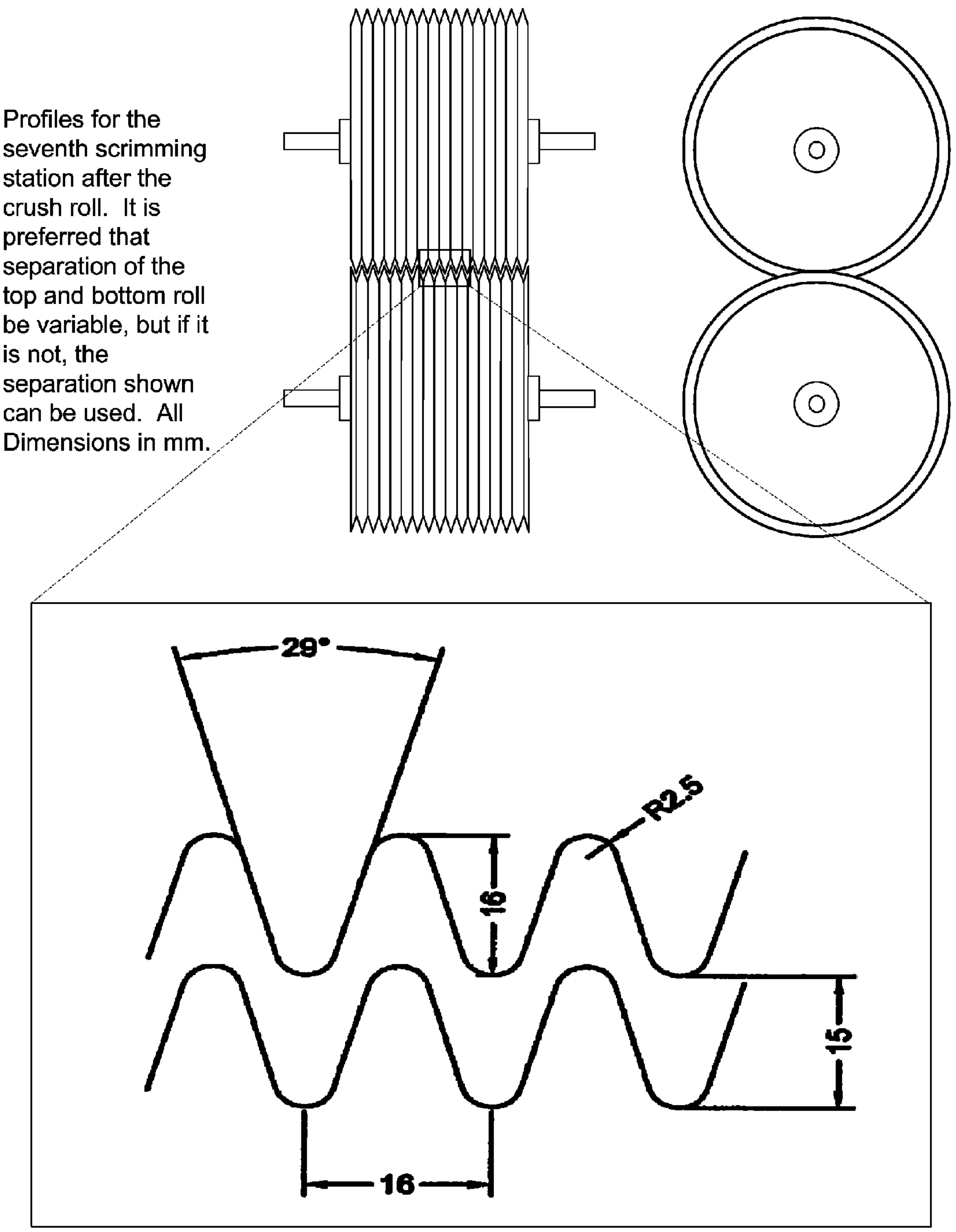
Figure 3H:
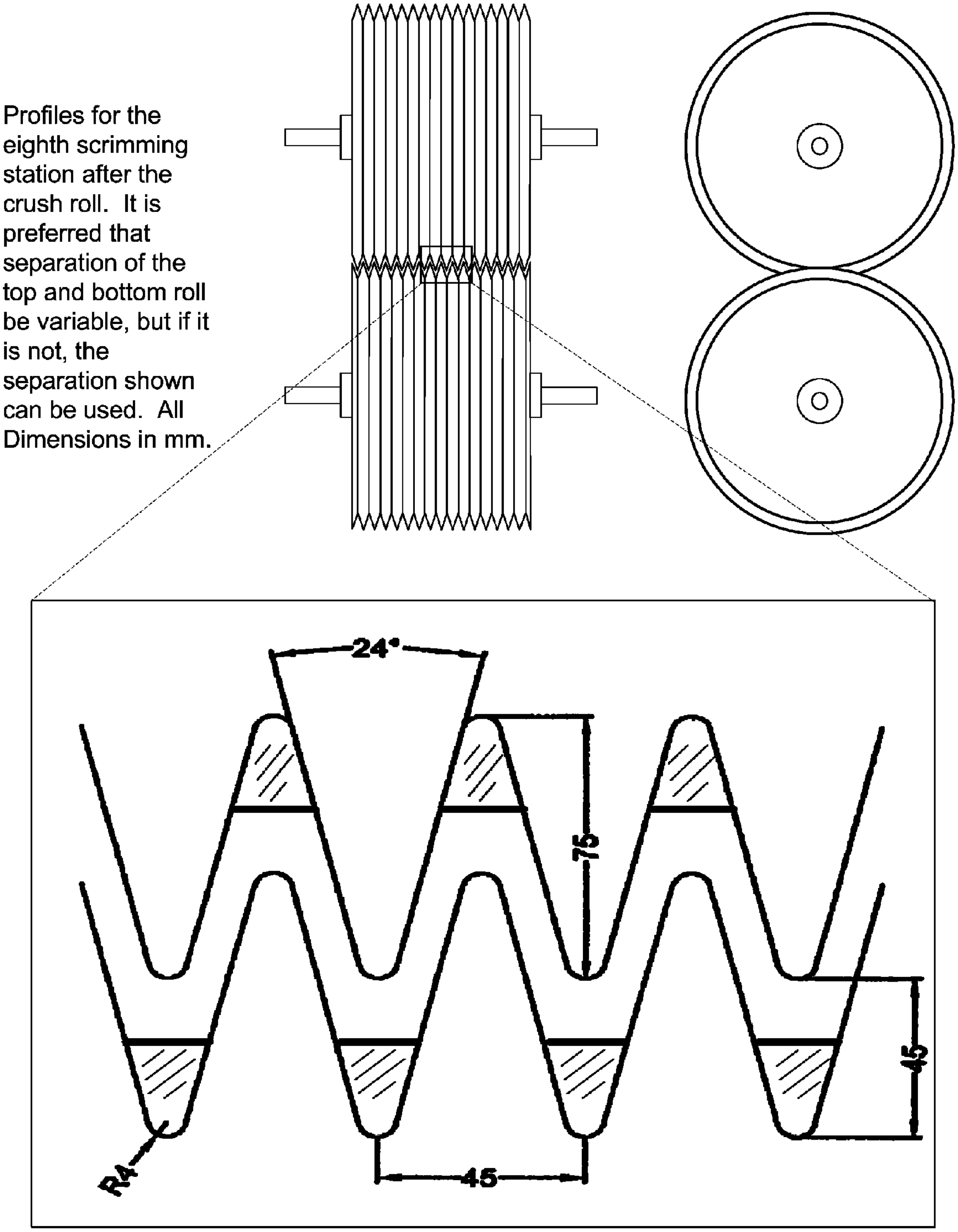

As the crushed log material is passed through each scrim station 25*a*-25*g*, the distance or space gap between each consecutive scrim roll set becomes progressively smaller, thus resulting in a finely crushed log material mat or scrim log material mat. This specific design assists in reducing the diameter of the scrim in a series of consecutive stages without reducing the strength of the scrim fiber strands. The design of the profiles on each of the respective scrimming station is different (as illustrated in FIGS. 3A-3*g*). Within further aspects of the present invention, as illustrated in FIG. 3H, alternative scrim roll profiles may be implemented at any scrim roll station within the system 100. As seen in FIG. 3H, the flute depth of a scrim roll can be reduced, while the pitch distance remains the same. As shown in FIG. 3H, either filling the flute groove with a durable substance or not machining the flute groove to its entire depth at the manufacture of the scrim roll can reduce the flute depth of a scrim roll. The scrim roll configuration of FIG. 3H assists in clearing processed scrim from a scrim roll set and thus can be implemented on a scrimming line in the instances where there is constant trouble within a production process from the strands of the scrim becoming lodged within the scrim rolls during the scrimming process.

As mentioned above, the objective of the scrimming stations 25*a*-25*g* is to produce a group of separately defined, but not discrete, strands in which most of the strands are the original length of the log in addition to being evenly separated from each other. This aspect of the present invention is enhanced by the present invention's ability to dynamically control the spacing between a discrete scrim roll set, and the speed at which the scrim roll set is operating. This feature is accomplished by utilizing the log diameter data that was obtained at the log scanning station to determine the optimum spacing between the top and bottom scrim roll of a scrimming roll set. Once the optimum spacing is established for a respective scrim roll set, the scrim roll set can be configured to the established optimum spacing by either a manual means or via a computerized control system within aspects of the present invention.

In some instances, as logs are being processed at the scrim crushing stations 25*a*-25*g* the leading edges of some logs may have a tendency to produce larger scrim log material than is desired. Aspects of the present invention provide a solution to this particular problem. Specifically, prior to entering a predetermined scrim station 25*a*-25*g* the scrim log material is rotated 180°, this solution provides an appropriate remedy to this particular problem. This orientation changing feature places larger scrim log material on the back sides of the remaining scrim station 25*a*-25*g* roll sets and thus results in a more homogeneous scrim log material mat. Within further aspects of the present invention, the scrim log material can be separated into predetermined mat bundle sizes at pre-specified scrimming stations 25*a*-25*g* situated upon the log processing line. This particular featured aspect aids in the subsequent performance of the lay-up and pre-pressing operations that are performed within embodiments of the present invention.

Once the scrim log material has exited the scrimming stations 25*a*-25*g*, the scrim log material mat is transported to a first drying station 35 (FIG. 1). Within aspects of the present invention the drying of a scrim log material mat is accomplished in two steps. Initially, wet scrim log material is dried at the first drying station 35 at a temperature in the range of 120° to 190° C. with a margin of temperature correction to be ±5° C. The moisture content range for the dried scrim log material should be in the range of 10% to 20%.

The resultant moisture content of the scrim log material mat at the first drying process of the first drying station 35 is used to control the uptake of a bonding agent/resin mixture that will subsequently be applied to the scrim log material mat. The scrim log material mat will absorb the bonding agent/resin mix based upon the moisture content of the scrim log material mat that has been reached in the first drying cycle. A drying temperature curve is established for a bonding agent/resin, wherein the curve is a function of the time and moisture content conditions of a material that are necessary to ensure that once the bonding agent/resin is applied to a material, the bonding agent/resin will dry properly. Once a drying temperature curve is determined for a particular bonding agent/resin, the moisture content of the scrim log material mat can be controlled through the drying process to effectively target the amount of bonding agent/resin that will be applied to the scrim log material.

Upon exiting the first drying station 35, the scrim log material is transported to a bonding agent/resin application area 40 wherein a bonding agent/resin is applied to the scrim log material mat. Applying a bonding agent/resin to the strands of the scrim log material requires that the bonding agent coat all of the exposed surfaces of the scrim log material mat, including the fine cracks can that develop in the material during processing. Flooding the strands of the scrim log material mat with bonding agent/resin from a weir or similar device will provide sufficient coverage of all the surfaces of the scrim log material mat. The flooding rate of the bonding agent/resin onto the strands of the scrim log material mat must be high enough to coat the bottom surfaces and interior areas that might be shadowed by surface strands. All exposed surfaces of the strands of the scrim log material mat must be applied with an adequate amount of bonding agent/resin in order to form high strength bonds.

Preferably the bonding agent/resin will be applied without disturbing or disorienting the strands of the scrim log material mat, wherein all of the surfaces of the mat are covered by the bonding agent/resin. The bonding agent/resin can be applied in a cascading "waterfall" pattern, the bonding agent/resin being applied over the top and sides of the scrim log material mat and the bottom of the mat being coated with the excess bonding agent/resin that splashes up from a tray bottom situated below the scrim log material mat. Within aspects of the present invention, air knives can be utilized to remove the excess bonding agent/resin from the scrim log material mat, the excess bonding agent/resin being recycled for further use within the bonding agent/resin applicator 400 (FIG. 4).

Within additional aspects of the present invention, squeeze roller press sets 37 are implemented, wherein prior to the application of the bonding agent/resin, a scrim log material mat is passed through the squeeze roller press sets 37 in order to further compress the scrim log material mat in order to open any fissures or cracks within the scrim log material mat. This procedure aids in ensuring that in the subsequent bonding agent/resin application step, the bonding agent/resin will be uniformly applied upon the fiber strands of the scrim log material mat.

Figure 4A:
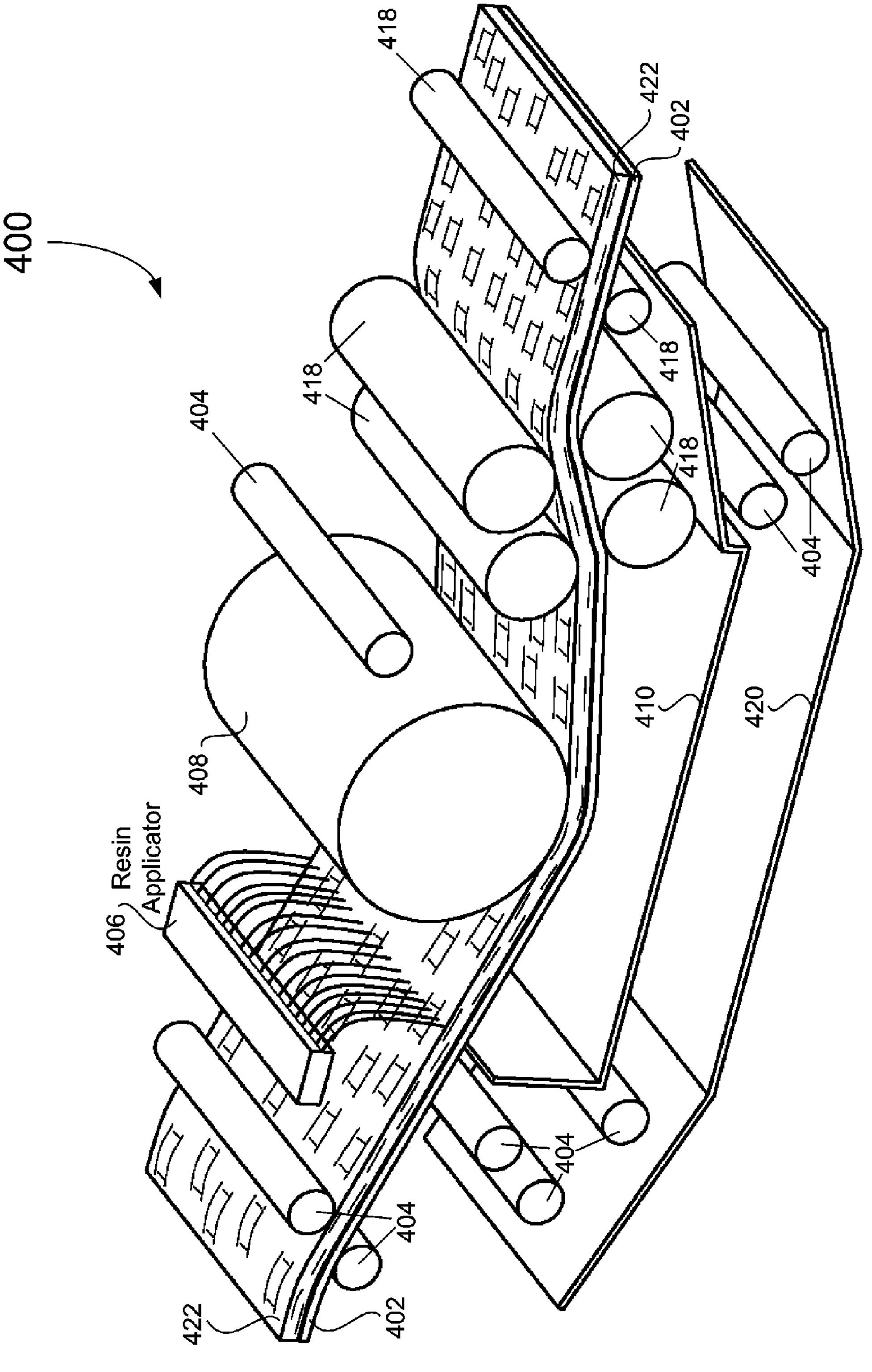
FIG. 4A is a diagram showing a perspective of a resin applicator that may be used with embodiments of the present invention.
Figure 4B:
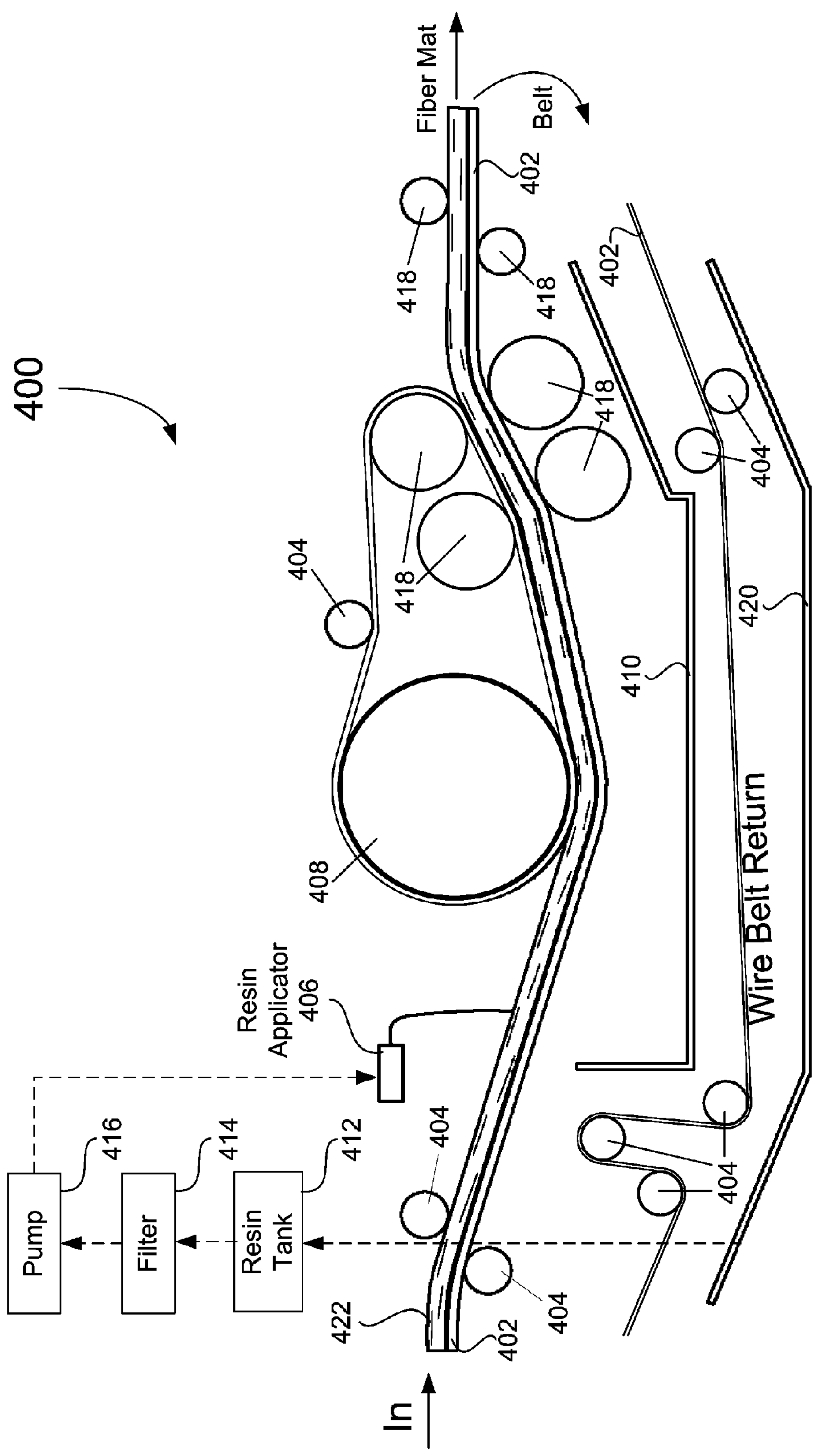
FIG. 4B is a diagram showing a perspective of a resin applicator with belts applicator belts removed, that may be used with embodiments of the present invention.

FIGS. 4A and 4B illustrate perspectives of a bonding agent/resin applicator 400 that may be implemented within aspects of the present invention. In aspects of the present invention, a scrim log material mat 422 will enter the bonding agent/resin applicator 400 at a first end via a conveyor feed belt 402. The feed belt 402 is in mechanical contact with a series of roller sets 404, wherein the directional movement and speed of the roller sets 404 directly correlates to the speed and direction of the feed belt 402. Bonding agent/resin is applied to the scrim log material mat via a weir overflow applicator 406. Preferably, the weir overflow applicator 406 comprises dimensions that are sufficient to allow for the applicator device 406 to be situated across the entire width of the conveyor feed belt 402. Also featured in the bonding agent/resin application area is an applicator roll 408, wherein the applicator roll 408 is used to apply pressure to a scrim log material mat and thus assist in ensuring that the bonding agent/resin evenly permeates the scrim log material mat. Further, a corrugated pan 410 is situated below the conveyor feed belt 402 and the applicator roll 408 in the bonding agent/resin application area.

The corrugated pan 410 is used to capture the overflow from the weir overflow applicator 406. Functionally the corrugated pan 410 is used in conjunction with the applicator roll 408 to ensure that bonding agent/resin is also applied to the underside of the scrim log material mat. The application of bonding agent/resin to the underside of a scrim log material mat is accomplished with a pressing function that is performed by the applicator roll 408. This function is accomplished as the scrim log material mat is transported beneath the applicator roll 408, the applicator roll 408 presses downward on the scrim log material mat, thus submerging the scrim log material mat into the excess bonding agent/resin that is contained within the corrugated pan 410. The resin applicator 400 additionally comprises a bonding agent/resin tank 412, wherein the bonding agent/resin is stored, in addition to a bonding agent/resin filter 414 and bonding agent/resin pump 416. Bonding agent/resin that is stored within the tank 412 is filtered at the filter 414 and pumped into the weir overflow applicator 406 via the pump 416.

As a scrim log material mat is feed into the weir overflow applicator 406 region, a continuous flow of bonding agent/resin is applied to the scrim log material mat. As mentioned above, the mat is then fed under the applicator roll 408, wherein the applicator roll 408 applies pressure to the scrim log material mat in order to ensure that the bonding agent/resin evenly permeates the scrim log material mat. Next, the scrim log material mat is fed into a series of squeeze rolls 418, the squeeze rolls 418 being used to wring the excess bonding agent/resin from the scrim log material mat. The excess bonding agent/resin that has been wrung from the scrim log material mat is collected within a drip pan 420 that is situated beneath the squeeze rolls 418, the excess bonding agent/resin thereafter being returned to the bonding agent/resin tank 412 for continued use within the applicator system 400. Upon exiting the squeeze rolls 418, the scrim log material mat is then transported out of the resin applicator system 400 via a second end.

Once the bonding agent/resin has been applied to the scrim log material mat the scrim log material mat is transported to a second drying station 45 (FIG. 1). The secondary drying station 45 operates at a lower temperature than the first drying station 35. This system configuration is necessary in order to prevent pre-curing the bonding agent/resin that has been applied to the scrim log material. Additionally, the second drying station operates at a temperature range of about 100° to about 150° C. The purpose of the secondary dryer is to B-stage the bonding agent/resin and bring the moisture content of the wood strands to a range of 3-10%. As those of ordinary skill in the art will understand, a B-stage for a thermosetting bonding agent/resin is an intermediate state of curing, wherein the bonding agent/resin possesses the property of becoming permanently hard and rigid when heated or cured.

A scrim log material mat should be composed of a predetermined width and weight in order to aid in the lay-up of the mats directly to the drying operations of the first 35 and second drying stations 45. At the mat lay-up station 50*a* area the moisture content in addition to the width and weight of the scrim log material mat are determined in order to ascertain the density of the scrim log material mat, and to ensure that the mat does not comprise any voids. This determination is accomplished with the use of a computerized control system (not shown). Any voids that are determined to be present in the mats are closed during the determination of the initial width and weight adjustments of the mats.

Within preferred aspects of the present invention the weight of a scrim log mat can be determined using a weigh belt conveyor scale that is integrated into the conveyor transport system 7. A weigh belt conveyor scale can also be interfaced with a computer control system, wherein constant real-time scrim log material mat weight data is continuously transmitted to the computer control system for further use within the system 100. Additionally moisture meters may be configured within aspects of the present invention to measure the moisture content of a scrim log material mat. The moisture meters preferably being interfaced with the computer control system in order to provide real-time moisture content data to the control system.

Within further aspects of the present invention the mat lay-up station 50*a* comprises accelerating and decelerating belts (not shown). In additional aspects of the present invention, a scrim log material mat is deposited upon the accelerating/decelerating belt at the mat lay-up station 50*a*, wherein the belts serve the purpose of adjusting the weight of the scrim log material mat to a predetermined weight, and further, to close any voids that may have been discovered within the structure of a mat. The weight of a scrim log material mat can be determined upon the accelerating/decelerating belt using conventional weighing methods.

Upon the determination that the weight of a scrim log material mat is above a predetermined weight standard, the decelerating belt will be engaged to remove scrim log material from the mat until it is determined that the mat has reached the predetermined weight. Conversely, upon the determination that the weight of a scrim log material mat is below a predetermined weight, the acceleration belt would be engaged in order to deliver more scrim to the mat until the scrim log material mat has reached the predetermined weight.

Density variations within mats are reduced by the tapering of the ends of the mats and overlapping mats by alternating the light mat ends with the heavy mat ends. Any gaps or voids that are observed in the pre-formation of the mats during the mat lay-up operation should be filled. Within additional aspects of the present invention the mat ends can be laid-up end-to-end using butt joints, scarf joints, or lap joints. If the scrim mat ends are well broomed so that they will interlock with adjoining mats, a lap joint may be adequate. If the mat ends are heavy, lap joints will cause undesirable density variations and in this instance butt joints or scarf joints should be used. Scarf joints are preferable since scarf joints will bond the mats together and maintain the desired density.

Next, within aspects of the present invention the scrim log material mats are transported to a mat-former, a mat pre-press and loader 50*b* station, thereafter the mats are consecutively fed into a steam press chamber 55. The mat pre-press 50*b* is configured for the further refined formation of the scrim log material mat. Preferably, the mat pre-press 50*b* comprises either a set of platens or a roller press system for the refined formation of the scrim log material. A distinct aspect of the present invention is that the platens and the rollers of the roller press system of the pre-press at the mat-former press station 50*b* are configured to conduct heat after being heated to a predetermined temperature within further aspects of the invention. The heated pre-press not only assists in the further formation of the scrim log material mat, but also prepares the fibers of the mat by heating the mat prior to a mat's introduction into the steam press chamber 55. This particular aspect results in a reduction of the amount of time that the log scrim material mat is required to spend in subsequent steam press chamber 55 operations.

Prior to entering the steam press chamber 55, the scrim log material mats are introduced into an incremental cut-off system 52. FIG. 1 illustrates possible locations for the cut-off system 52*a*, 52*b*, and 52*c* (shown in phantom), but as will be understood, other locations prior to the steam press chamber are possible within embodiments of the present invention. The incremental cut-off system 52 permits the scrim log material mats to be cut to size in order to fit into the steam press chamber, resulting in a more efficient introduction of the mats into the steam press chamber 55 and higher yields of the final product.

The steam press chamber 55 that may be utilized within the present invention may comprises aspects wherein the steam press chamber 55 has a first and second end, the ends further comprising quick opening doors. By implementing quick opening doors at the ends of the steam press chamber 55, the steam press chamber 55 is easier to clean and maintain.

Further, the quick opening doors facilitate the loading and unloading of the steam press chamber 55 in a single operation that is similar to those of conventional hot presses. Hydraulic cylinders are located on the outside of the steam press chamber 55, further, seals that can withstand pressures up to 1500 kPa pressure are also implemented. With the hydraulic cylinders located outside the steam press chamber 55, rams can be fixed to the press platen with a “quick” release mechanism that allows for the easy removal of a press for cleaning and maintenance requirements.

The press plates of the steam press chamber 55 must comprise an adequate distance or daylight between the press plates in order to allow the efficient loading and unloading of the steam press chamber. The distance between plates or the daylight, should be a minimum of six to seven times a final product thickness in addition to any extra space or daylight that is needed to accommodate caul plates, loaders, etc. Further, the press platens should close completely to accommodate a plethora of various beam thicknesses and densities. All steam and hydraulic valves implemented within aspects of the steam press chamber can be automated and controlled by programmable logic controllers (PLCs).

An automated press cycle should control the steam input and exhaust, hydraulic pressures, vacuum (if required) and, in required situations, the position of the platens. Steam is supplied to the steam press chamber via a boiler or surge tank that is in mechanical connection with the steam press chamber 55, wherein the boiler comprises a volume that is equivalent to the volume of the steam press chamber. The boiler should be capable of supplying the required steam volume and pressure to an autoclave comprised within the steam press chamber in a predetermined amount of time. An accumulator on the boiler produces and supplies adequate volumes of steam quickly to the steam press chamber 55. Moreover, the preheating of the steam press chamber 55 additionally increases the steam input rate by producing less condensation during steam injection. This process requires a fair quantity of steam and accordingly the system is designed to maximize steam recover.

A further aspect of the present invention calls for the heating of the platens by hot oil. The use of hot oil allows for the platen temperatures to be controlled at a higher level than by way of the steam press chamber 55. Thus, the higher platen temperatures would improve surface quality and therefore assist in shortening the press cycle within the steam press chamber 55.

Within additional aspects of the present invention there are at least two thermostatic valves implemented in conjunction with the steam press chamber 55 (not shown). A first thermostatic valve is located on the left side of the steam press chamber 55 above the door at the first end of the chamber. This first valve allows air to escape the steam press chamber 55 by venting the steam press chamber 55 until the saturated steam temperature is reached. Since air at pressing conditions is heavier than steam, the thermostatic valves should be located near the bottom of the steam press chamber 55 near steam traps situated within the steam press chamber 55.

At least two valves are necessary at the bottom of the cylinder in order to obtain adequate air removal. The air in the steam press chamber 55 keeps the steam from saturating the steam press chamber 55 and thus affecting the curing of the bonding agent/resin that has been applied to the scrim log material mat. Air within the chamber must be removed by either an initial vacuum on the steam press chamber 55 or by the use of the thermostatic valves. Evacuation of air from the steam press chamber 55 must be accomplished in at least less than 20 seconds or there is a possibility the bonding agent/resin will pre-cure.

Within further aspects of the present invention a second thermostatic valve is situated under the steam press chamber 55 and controls the temperature of the platens. If has been determined that the current platen temperature causes pre-curing of the resin that has been applied to the scrim log mat, a lower temperature valve should be used. It is desirable within aspects of the present invention to have the platen temperatures at least 50-60° F. higher than the saturated steam temperature.

A most critical part of the steam press chamber cycle is the initial steaming of the log mats and the closing of the press platens. This aspect should be accomplished in a predetermined designated time in order to ensure the efficient production of a final product. Additional aspects of the press cycle (e.g., total steaming time, hydraulic pressure and press-closed time) can be adjusted within aspects of the present invention as needed.

Upon exiting the steam press chamber cycle, the scrim log material mats are commonly referred to as "billets" or "slabs." The handling of these billets or slabs is very important. The slabs are usually extremely large in size (e.g., they can be upwards of 60 ft long in length) in addition to being very hot and heavy (weighing upwards of 6000 lbs). Therefore, aspects of the present invention comprise cooling stations 58 for the cooling and transportation of the slabs to cut-off facility stations (not shown), wherein the slabs are cut into beams of predetermined dimensions. The slabs are accordingly handled in a manner that ensures that they will not be damaged between the cooling and transportation stages to the cut-off stations.

A yet further aspect of the present invention comprises a method for the manufacture of a reconstructed or reconsolidated wood product, the method comprises the steps of steaming a plurality of logs, wherein the logs are steamed for a time period not to exceed two hours, and respectively scanning each log in order to acquire data in regard to the diameter of a large and a small end of the log. Next, the first and the second end of the logs are cut at a predetermined angle of cut in order to enhance log scrim processing, the angle of cut being variable in a range greater than 15° and less than 60°.

The method further comprises the step of respectively feeding each log into a first log crushing station. The first log crushing station comprises a plurality of sets of crush rolls; the crush roll sets being configured to comprise a top crush roll and a bottom crush roll. The crush rolls also comprise a plurality of 20 mm diameter rods, wherein the rods are set in a range of 80 mm to 100 mm apart around the circumference of the crush rolls. Each log is then fed into a second log crushing station, the second log crushing station having the capability to oscillate the pressure that is applied to the crushed logs as the logs pass through the station.

Next, the crushed logs are sequentially fed into a plurality of scrim stations, each scrim station comprising a plurality of sets of scrim rolls for the further crushing and refining cutting of the crushed log, the scrim roll sets being configured to comprise a top scrim roll and a bottom scrim roll, wherein at a respective scrim station the scrim roll sets cut the crushed logs at angles in order to enhance the scrim processing, the angle of cut being variable in a range greater than 15° and less than 60°, the result of the log scrimming being a scrim log material.

Another aspect of the present invention comprises a computer program product that includes a computer readable medium that is usable by a control unit processor. The medium having stored thereon a sequence of instructions that when executed by a control unit processor causes the control unit processor to execute the step of scanning a log in order to acquire data in regard to the diameter of a large and a small end of the log. The method further determines the optimum spacing between a top scrim roll and a bottom scrim of a plurality of scrim roll sets based upon the acquired diameter of the large and small ends of the scanned log. The computer program product further comprises the step of dynamically adjusting the spacing between the top scrim roll and the bottom scrim roll of the scrim roll sets based upon the determined optimum spacing of each scrim roll set.

Therefore, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for the manufacture of a billet of steamed-pressed long fiber reconsolidated wood products, the system comprising:

- a bonding agent application system for applying bonding agent to a continuous length of scrim log material mat, the bonding agent application system comprising a bonding agent application squeeze roller press set, the bonding agent application squeeze roller press set being operative to compress the scrim log material mat to open fissures or cracks within the scrim log material mat in order to aid in the uniform application of the bonding agent onto the scrim log material mat, the bonding agent application system further comprising:
  - a tray through which the scrim log material mat is transported, the bonding agent being applied from above the scrim log material mat in a waterfall configuration such that the scrim log material mat is coated from above by the bonding agent and residual bonding agent flows over the scrim log material mat and into the tray and splashes up from the tray to coat the scrim log material mat from below, and
  - an air-knife system, the air-knife system being configured to remove excess applied bonding agent from exposed surfaces of the scrim log material mat, wherein excess bonding agent removed from the scrim log material mat is recovered and recycled for further use by the bonding agent application system;
- a drying system comprising a conveyor for transporting the scrim log material mat with the bonding agent applied thereto through the drying system, wherein the speed of the conveyor and the heat output by the drying system are configured to be regulated, the drying system operative for drying the scrim log material mat at a temperature range of between about 100° to 150° C., wherein the moisture content range for the coated scrim material is in the range of about 3% to 10%;
- a scrim log material mat lay-up system for receiving the scrim log material mat;
- a scrim log material mat pre-press system for heating and forming the scrim log material mat, the pre-press system comprising platens, the platens being configured to conduct heat, wherein the scrim log material mat pre-press system further comprises a roller press system, the rollers of the roller press system being configured to conduct heat at a predetermined temperature;
- an incremental mat cut-off system for cutting the scrim log material mat to a predetermined size to form a cut mat prior to the cut mat entering a steam press chamber; and
- the steam press chamber that receives the cut mat and applies a predetermined volume of steam to the cut mat in order to cure the bonding agent that has been applied to the cut mat, the steam press chamber further comprising a pressing mechanism, wherein the pressing mechanism is configured to compress the cut mat to a predetermined thickness and density to form the billet of steamed-pressed long fiber reconsolidated wood products.

2. The system of claim 1, wherein the scrim log material mat is cut to an optimal size by the incremental mat cut-off system for the cut mat to fit into the pressing mechanism of the steam press chamber.

3. The system of claim 1, wherein the moisture content and the weight of the scrim log material mat is determined at the scrim log material mat lay-up system.

4. The system of claim 3, wherein the width of the scrim log material mat is altered by the scrim log material mat lay-up system in order to remove any voids that may be present in the scrim log material mat and to further adjust the weight of the scrim log material mat to a predetermined desired weight.

5. The system of claim 1, wherein the heated pre-press platens at the scrim log material mat pre-press system are configured to heat the scrim log material mat at a predetermined temperature.

6. The system of claim 1, wherein the steam press chamber comprises a first and a second end wherein the first and second ends further comprise quick-release door mechanisms that assist in the rapid charging of cut mats into the steam press chamber and discharging of billets out of the steam press chamber.

7. The system of claim 1, wherein the steam press chamber further comprises an accumulator or surge tank for the rapid discharge of steam into the steam press chamber.

8. The system of claim 6, wherein the steam press chamber further comprises a vacuum pump for the rapid decompression of the steam press chamber upon the closing of the quick-release door mechanisms, thus allowing for the quick and efficient entry of steam into the steam press chamber.

9. The system of claim 1, further comprising a cooling station wherein the billets are placed in order to cool until the applied bonding agent has set.

10. A method for the manufacture of a billet of steamed-pressed long fiber reconsolidated wood products, the method comprising the steps of:

- applying a bonding agent to a continuous length of scrim log material mat;
- drying the scrim log material mat by applying heat at a drying station after bonding agent has been applied to the mat, wherein the heat generated by the drying station and the speed of a conveyor system transporting the scrim log material mat through the drying station are regulated by a computerized control system;
- transporting the dried scrim log material mat to a scrim log material mat lay-up system;
- determining the moisture content and weight of the scrim log material mat as the mat enters the scrim log material mat lay-up system;
- removing any voids that may be present in the scrim log material mat while the mat is inside the scrim log material mat lay-up system;
- adjusting the weight of the scrim log material mat to a predetermined weight based upon a predetermined moisture content level in the scrim log material mat by utilizing a combination of accelerating and decelerating conveyor belts while the mat is inside the scrim log material mat lay-up system;
- heating and forming the scrim log material mat at a pre-press system, the pre-press system comprising a set of platens, wherein the platens are configured to conduct heat;
- cutting the scrim log material mat to a predetermined size to form a cut mat before the mat enters a steam press chamber; and
- steaming the cut mat at the steam press chamber, wherein the steam press chamber is configured to release a predetermined volume of steam from a surge tank into the steam press chamber in order to cure the bonding agent that has been applied to the cut mat to form the billet of steamed-pressed long fiber reconsolidated wood products, wherein the volume of the surge tank is equal to the volume of the steam press chamber.

11. The method of claim 10, further comprising the step of removing any excess bonding agent from all exposed surfaces of the scrim log material mat before the mat is dried.

12. The method of claim 11, further comprising the step of recovering and recycling the excess bonding agent for further use.

13. The method of claim 10, wherein the step of drying the scrim log material mat includes drying the mat at a temperature range of about 100 to 150° C., and wherein the moisture content range for the coated scrim log material mat is in the range of about 3% to 10%.

14. The method of claim 10, wherein the step of cutting the scrim log material mat into a cut mat includes cutting the mat to an optimal size in order for the cut mat to fit into the steam press chamber.

15. The method of claim 10, wherein the set of platens at the pre-press system are configured to heat the scrim log material mat to a predetermined temperature.

16. The method of claim 10, wherein the pre-press system further comprises a roller press system, the rollers of the roller press system being configured to conduct heat and heat the scrim log material to a predetermined temperature.

17. The method of claim 10, wherein the steam press chamber comprises a first and a second end wherein the first and second ends further comprise quick-release doors in order to assist in the rapid charging of cut mats into the steam press chamber and discharging of billets out of the steam press chamber.

18. The method of claim 10, wherein the steam press chamber further comprises a pressing mechanism, wherein the pressing mechanism is configured to compress the cut mat to a predetermined thickness and density to form the billet.

19. The method of claim 18, further comprising the step of compressing the cut mat to a predetermined thickness and density within the steam press chamber to form the billet.

20. A system for the manufacture of a billet of steamed-pressed long fiber reconsolidated wood products, the system comprising:

a bonding agent application system for applying bonding agent to a continuous length of scrim log material mat, the bonding agent application system comprising a bonding agent application squeeze roller press set, the bonding agent application squeeze roller press set being operative to compress the scrim log material mat to open fissures or cracks within the scrim log material mat in order to aid in the uniform application of the bonding agent onto the scrim log material mat;

a drying system including a conveyor for transporting the scrim log material mat with the bonding agent applied thereto through the drying system, wherein the speed of the conveyor and the heat output by the drying system are configured to be regulated;

a scrim log material mat lay-up system for receiving the scrim log material mat;

a scrim log material mat pre-press system for heating and forming the scrim log material mat, the pre-press system comprising platens and a roller press system, the rollers of the roller press system and platens being configured to conduct heat at a predetermined temperature;

an incremental mat cut-off system for cutting the scrim log material mat to a predetermined size to form a cut mat prior to the cut mat entering a steam press chamber; and the steam press chamber for receiving the cut mat and applying a predetermined volume of steam to the cut mat in order to cure the bonding agent that has been applied to the cut mat, the steam press chamber further comprising a pressing mechanism, wherein the pressing mechanism is configured to compress the cut mat to a predetermined thickness and density to form the billet of steamed-pressed long fiber reconsolidated wood products.

21. The system of claim 20, wherein the bonding agent application system further comprises an air-knife system, the air-knife system being configured to remove excess applied bonding agent from exposed surfaces of the scrim log material mat.

22. The system of claim 21, wherein excess bonding agent removed from the scrim log material mat is recovered and recycled for further use by the bonding agent application system.

23. The system of claim 20, wherein the drying system dries the scrim log material mat at a temperature range of between about 100° to 150° C., wherein the moisture content range for the coated scrim material is in the range of about 3% to 10%.

24. The system of claim 20, wherein the bonding agent application system further comprises a tray through which the scrim log material mat is transported, the bonding agent being applied from above the scrim log material mat in a waterfall configuration such that the scrim log material mat is coated from above by the bonding agent and residual bonding agent flows over the scrim log material mat and into the tray and splashes up from the tray to coat the scrim log material mat from below.

25. The system of claim 20, wherein the scrim log material mat is cut to an optimal size by the incremental mat cut-off system for the cut mat to fit into the pressing mechanism of the steam press chamber.

26. The system of claim 20, wherein the moisture content and the weight of a scrim log material mat is determined at the scrim log material mat lay-up system.

27. The system of claim 20, wherein the dimensions of the scrim log material mat are altered by the scrim log material mat lay-up system in order to remove any voids that may be present in the scrim log material mat and to further adjust the weight of the scrim log material mat to a predetermined desired weight.

28. The system of claim 20, wherein the heated pre-press platens at the scrim log material mat pre-press system are configured to heat the scrim log material mat at a predetermined temperature.

29. The system of claim 20, wherein the steam press chamber comprises a first and a second end wherein the first and second ends further comprise quick-release door mechanisms that assist in the rapid charging of cut mats into the steam press chamber and discharging of billets out of the steam press chamber.

30. The system of claim 29, wherein the steam press chamber further comprises a vacuum pump for the rapid decompression of the steam press chamber upon the closing of the quick-release door mechanisms, thus allowing for the quick and efficient entry of steam into the steam press chamber.

31. The system of claim 20, wherein the steam press chamber further comprises an accumulator or surge tank for the rapid discharge of steam into the steam press chamber.

32. The system of claim 20, further comprising a cooling station wherein the billets are placed after exiting the steam press chamber in order to cool until the applied bonding agent has set.

33. A method for the manufacture of a billet of steamed-pressed long fiber reconsolidated wood products, the method comprising the steps of:

applying a bonding agent to a continuous length of scrim log material mat;

drying the scrim log material mat at a drying station after bonding agent has been applied to the mat, wherein the amount of heat generated by the drying station and the speed of a conveyor system transporting the scrim log material mat through the drying station are regulated by a computerized control system;

transporting the dried scrim log material mat to a scrim log material mat lay-up system;

heating and forming the scrim log material mat at a pre-press system, the pre-press system comprising a set of platens and a roller press system, wherein the rollers of the roller press system and the platens are configured to heat the scrim log material mat to a predetermined temperature;

cutting the scrim log material mat to a predetermined size to form a cut mat prior to the mat entering a steam press chamber; and steaming the cut mat at the steam press chamber, wherein the steam press chamber is configured to release a predetermined volume of steam from a surge tank into the steam press chamber in order to cure the bonding agent that has been applied to the cut mat to form the billet of steam-pressed long fiber reconsolidated wood products, wherein the volume of the surge tank is equal to the volume of the steam press chamber.

34. The method of claim 33, further comprising the step of removing any excess bonding agent from all exposed surfaces of the scrim log material mat before the mat is dried.

35. The method of claim 34, further comprising the step of recovering and recycling the excess bonding agent for further use.

36. The method of claim 33, wherein the step of drying the scrim log material mat includes drying the mat at a temperature range of about 100° to 150° C., and wherein the moisture content range for the coated scrim log material mat is in the range of about 3% to 10%.

37. The method of claim 33, wherein the step of cutting the scrim log material mat into the cut mat includes cutting the mat to an optimal size in order for the cut mat to fit into the steam press chamber.

38. The method of claim 33, further comprising the step of determining the moisture content and the weight of the scrim log material mat as the mat enters the scrim log material mat lay-up system.

39. The method of claim 33, further comprising the step of removing any voids that may be present in the scrim log material mat while the mat is inside the scrim log material mat lay-up system.

40. The method of claim 33, further comprising the step of adjusting the weight of the scrim log material mat to a predetermined weight based upon a predetermined moisture content level in the scrim log material mat by utilizing a combination of accelerating and decelerating conveyor belts while the mat is inside the scrim log material mat lay-up system.

41. The method of claim 33, wherein the steam press chamber comprises a first and a second end wherein the first and second ends further comprise quick-release doors in order to assist in the rapid charging of cut mats into the steam press chamber and discharging of billets out of the steam press chamber.

42. The method of claim 33, wherein the steam press chamber further comprises a pressing mechanism, wherein the pressing mechanism is configured to compress the cut mat to a predetermined thickness and density to form the billet.

43. The method of claim 42, further comprising the step of compressing the cut mat to a predetermined thickness and density within the steam press chamber to form the billet.

44. A method for the manufacture of a billet of steamed-pressed long fiber reconsolidated wood products, the method comprising the steps of:

applying a bonding agent to a continuous length of scrim log material mat;

drying the scrim log material mat at a drying station after bonding agent has been applied to the mat, wherein the heat generated by the drying station and the speed of a conveyor system transporting the scrim log material mat through the drying station are regulated by a computerized control system;

transporting the dried scrim log material mat to a scrim log material mat lay-up system;

determining the moisture content and weight of the scrim log material mat as the mat enters the scrim log material mat lay-up system;

heating and forming the scrim log material mat at a pre-press system, the pre-press system comprising a set of platens, wherein the platens are configured to conduct heat, wherein the pre-press system further comprises a roller press system, the rollers of the roller press system being configured to conduct heat and heat the scrim log material to a predetermined temperature;

cutting the scrim log material mat to a predetermined size to form a cut mat before the mat enters a steam press chamber; and steaming the cut mat at the steam press chamber, wherein the steam press chamber is configured to release a predetermined volume of steam from a surge tank into the steam press chamber in order to cure the bonding agent that has been applied to the cut mat to form the billet of steamed-pressed long fiber reconsolidated wood products, wherein the volume of the surge tank is equal to the volume of the steam press chamber.

45. The method of claim 44, further comprising the step of removing any excess bonding agent from all exposed surfaces of the scrim log material mat before the mat is dried.

46. The method of claim 45, further comprising the step of recovering and recycling the excess bonding agent for further use.

47. The method of claim 44, wherein the step of drying the scrim log material mat includes drying the mat at a temperature range of about 100 to 150° C., and wherein the moisture content range for the coated scrim log material mat is in the range of about 3% to 10%.

48. The method of claim 44, wherein the step of cutting the scrim log material mat into a cut mat includes cutting the mat to an optimal size in order for the cut mat to fit into the steam press chamber.

49. The method of claim 44, further comprising the step of removing any voids that may be present in the scrim log material mat while the mat is inside the scrim log material mat lay-up system.

50. The method of claim 44, further comprising the step of adjusting the weight of the scrim log material mat to a predetermined weight based upon a predetermined moisture content level in the scrim log material mat by utilizing a combination of accelerating and decelerating conveyor belts while the mat is inside the scrim log material mat lay-up system.

51. The method of claim 44, wherein the set of platens at the pre-press system are configured to heat the scrim log material mat to a predetermined temperature.

52. The method of claim 44, wherein the steam press chamber comprises a first and a second end wherein the first and second ends further comprise quick-release doors in order to assist in the rapid charging of cut mats into the steam press chamber and discharging of billets out of the steam press chamber.

53. The method of claim 44, wherein the steam press chamber further comprises a pressing mechanism, wherein the pressing mechanism is configured to compress the cut mat to a predetermined thickness and density to form the billet.

54. The method of claim 53, further comprising the step of compressing the cut mat to a predetermined thickness and density within the steam press chamber to form the billet.

* * * * *